US012058490B2

(12) United States Patent
Carlile et al.

(10) Patent No.: US 12,058,490 B2
(45) **Date of Patent: *Aug. 6, 2024**

(54) EAR-MOUNTABLE LISTENING DEVICE WITH MAGNETIC CONNECTOR

(71) Applicant: Iyo Inc., Redwood City, CA (US)

(72) Inventors: Simon Carlile, Sydney (AU); Jason Steven Rugolo, Gilbert, AZ (US)

(73) Assignee: Iyo Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/336,937

(22) Filed: Jun. 16, 2023

(65) Prior Publication Data

US 2023/0336906 A1 Oct. 19, 2023

Related U.S. Application Data

(63) Continuation of application No. 17/345,594, filed on Jun. 11, 2021, now Pat. No. 11,729,542.

(51) Int. Cl.
*H04R 1/10* (2006.01)

(52) U.S. Cl.
CPC ......... *H04R 1/1058* (2013.01); *H04R 1/1016* (2013.01)

(58) Field of Classification Search
CPC combination set(s) only.
See application file for complete search history.

(56) References Cited

U.S. PATENT DOCUMENTS

| | | | |
|---|---|---|---|
| 8,317,048 B2 | 11/2012 | Hajichristou et al. | |
| 8,373,527 B2 * | 2/2013 | Fullerton .............. | H01F 7/0273 335/306 |
| 8,643,454 B2 | 2/2014 | Fullerton et al. | |
| 9,516,404 B2 * | 12/2016 | Parkins .................. | H04M 1/05 |
| 9,971,407 B2 | 5/2018 | Holenarsipur et al. | |
| 10,024,690 B2 | 7/2018 | Eisenbeis | |

(Continued)

FOREIGN PATENT DOCUMENTS

| | | | |
|---|---|---|---|
| CN | 213403470 U * | 6/2021 | ............... H04R 1/10 |
| CN | 213403470 U | 6/2021 | |
| KR | 101528876 B1 | 6/2015 | |

OTHER PUBLICATIONS

International Search Report and Written Opinion, PCT App. No. PCT/US2022/032218, Sep. 27, 2022, 10 pages.

(Continued)

*Primary Examiner* — Oyesola C Ojo
(74) *Attorney, Agent, or Firm* — Ahmann Kloke LLP

(57) ABSTRACT

An ear-mountable listening device includes an acoustic package and an electronics package. The acoustic package is configured to emit audio in response to an audio signal. The acoustic package includes a first set of magnets arranged annularly about a central axis of the ear-mountable listening device. The electronics package is electrically coupled to the acoustic package when the ear-mountable listening device is worn to provide the audio signal to the acoustic package. The electronics package includes a second set of magnets arranged annularly about the central axis proximate to a proximal end of the electronics package to removably affix the electronics package to the acoustic package via magnetic forces between the first set of magnets and the second set of magnets.

20 Claims, 9 Drawing Sheets

(56) References Cited

U.S. PATENT DOCUMENTS

| | | | |
|---|---|---|---|
| 10,805,703 B1 | 10/2020 | Bikumala et al. | |
| 11,350,225 B2 * | 5/2022 | Newton | H04R 25/505 |
| 2007/0149261 A1 * | 6/2007 | Huddart | H04R 5/033 455/575.2 |
| 2015/0023518 A1 * | 1/2015 | Mizrahi | H04R 1/1091 381/74 |
| 2015/0370529 A1 * | 12/2015 | Zambetti | G06F 3/0482 345/156 |
| 2017/0195795 A1 * | 7/2017 | Mei | H04S 7/304 |
| 2017/0230744 A1 * | 8/2017 | Schrader | G10K 11/17855 |
| 2018/0007460 A1 * | 1/2018 | Yan | H04R 1/1008 |
| 2018/0184192 A1 * | 6/2018 | Na | H04R 1/1091 |
| 2018/0234768 A1 * | 8/2018 | Kong | H04S 1/007 |
| 2019/0020942 A1 * | 1/2019 | Tang | H04R 1/1016 |
| 2020/0107110 A1 * | 4/2020 | Ji | G01V 3/081 |
| 2021/0037309 A1 | 2/2021 | Saule et al. | |
| 2022/0015703 A1 * | 1/2022 | Mirov | A61B 5/374 |

OTHER PUBLICATIONS

What's Special About Polymagnets, Polymagnets—Correlated Magnetics, www.polymagnet.com/polymagnets, Oct. 21, 2020.

* cited by examiner

EAR-MOUNTABLE LISTENING DEVICE WITH MAGNETIC CONNECTOR

CROSS-REFERENCE TO RELATED APPLICATIONS

This application is a continuation of U.S. patent application Ser. No. 17/345,594, filed on Jun. 11, 2021 and entitled "EAR-MOUNTABLE LISTENING DEVICE WITH MAGNETIC CONNECTOR," which is incorporated herein by reference in its entirety.

TECHNICAL FIELD

This disclosure relates generally to the field of acoustic devices, and in particular but not exclusively, relates to ear-mountable listening devices.

BACKGROUND INFORMATION

Ear mounted listening devices include headphones, which are a pair of loudspeakers worn on or around a user's ears. Circumaural headphones use a band on the top of the user's head to hold the speakers in place over or in the user's ears. Another type of ear mounted listening device is known as earbuds or earpieces and include individual monolithic units that plug into the user's ear canal.

Both headphones and ear buds are becoming more common with increased use of personal electronic devices. For example, people use headphones to connect to their phones to play music, listen to podcasts, place/receive phone calls, or otherwise. However, headphone devices are currently not designed for all-day wearing since their presence blocks outside noises from entering the ear canal without accommodations to hear the external world when the user so desires. Thus, the user is required to remove the devices to hear conversations, safely cross streets, etc.

Hearing aids for people who experience hearing loss are another example of an ear mountable listening device. These devices are commonly used to amplify environmental sounds. While these devices are typically worn all day, they often fail to accurately reproduce environmental cues, thus making it difficult for wearers to localize reproduced sounds. As such, hearing aids also have certain drawbacks when worn all day in a variety of environments. Furthermore, conventional hearing aid designs are fixed devices intended to amplify whatever sounds emanate from directly in front of the user. However, an auditory scene surrounding the user may be more complex and the user's listening desires may not be as simple as merely amplifying sounds emanating directly in front of the user.

With any of the above ear mountable listening devices, monolithic implementations are common. These monolithic designs are not easily custom tailored to the end user, and if damaged, require the entire device to be replaced at greater expense. Accordingly, a dynamic and multiuse ear mountable listening device capable of providing all day comfort in a variety of auditory scenes is desirable.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system, apparatus, and method of operation for an ear-mountable listening device with magnetic connector are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Described herein are embodiments of a binaural listening system and/or modular ear-mountable listening device including an acoustic package configured to emit audio in response to an audio signal and an electronics package to provide the audio signal to the acoustic package. The acoustic package and the electronics package each contain sets of magnets arranged to form a magnetic connector to removably affix the electronics package to the acoustic package via magnetic forces between the sets of magnets. Additionally, in some embodiments, the sets of magnets may be utilized, in combination with one or more sensors, to provide a rotary user interface (e.g., via rotation of the electronics package while the acoustic package remains fixed in place when the ear-mountable listening device is worn).

Figure 1A:
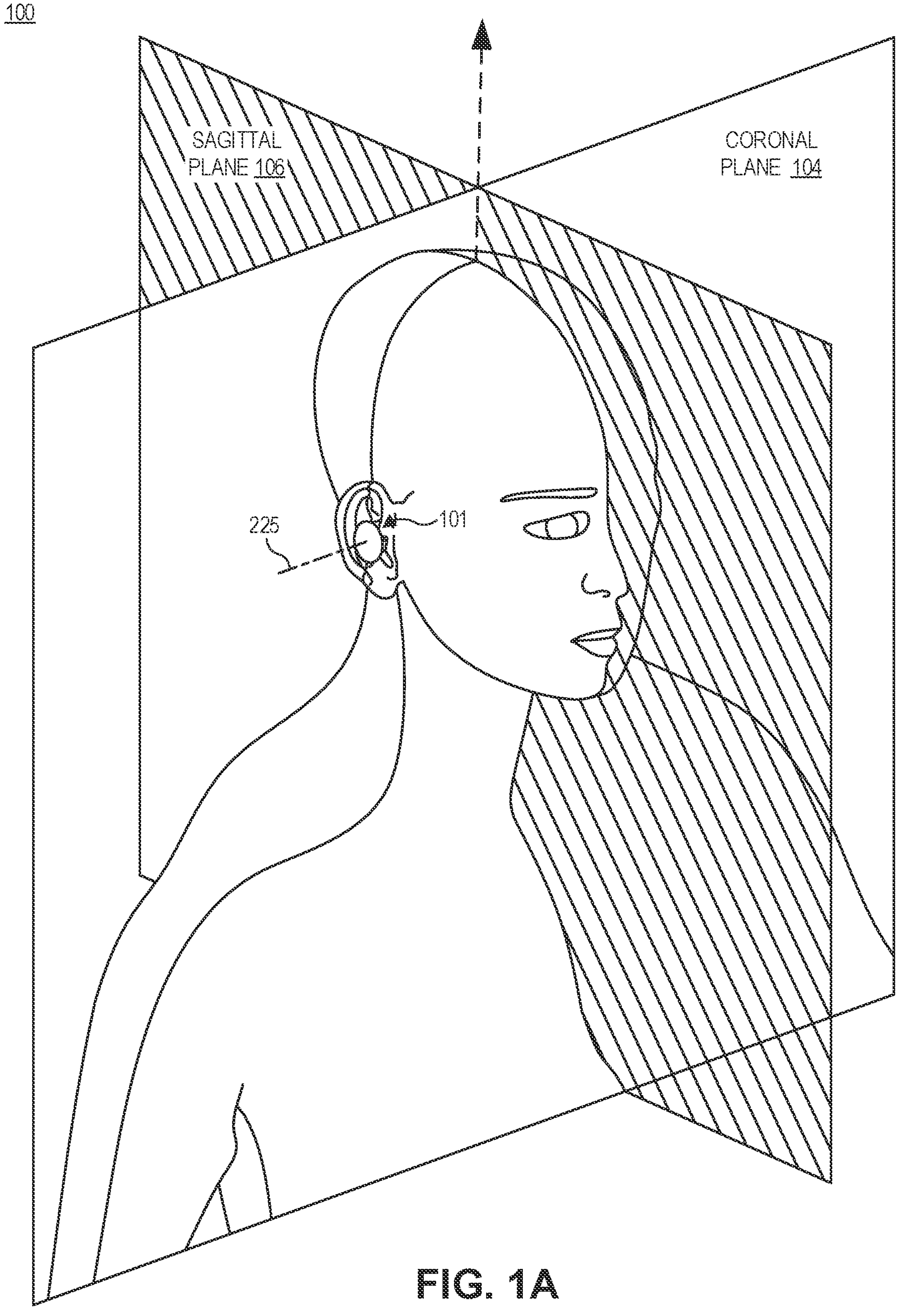
FIG. 1A illustrates a binaural listening system including an ear-mountable listening device when worn plugged into an ear canal, in accordance with an embodiment of the disclosure.
Figure 1B:
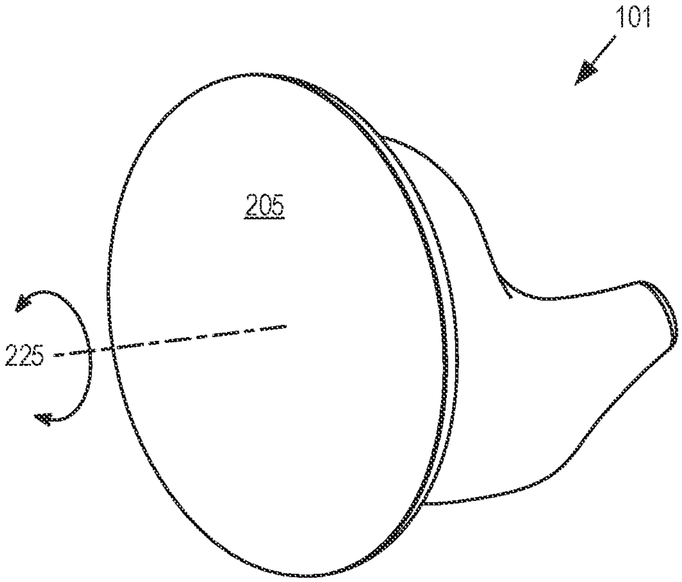
FIG. 1B is a front perspective illustration of the ear-mountable listening device, in accordance with an embodiment of the disclosure.
Figure 1C:
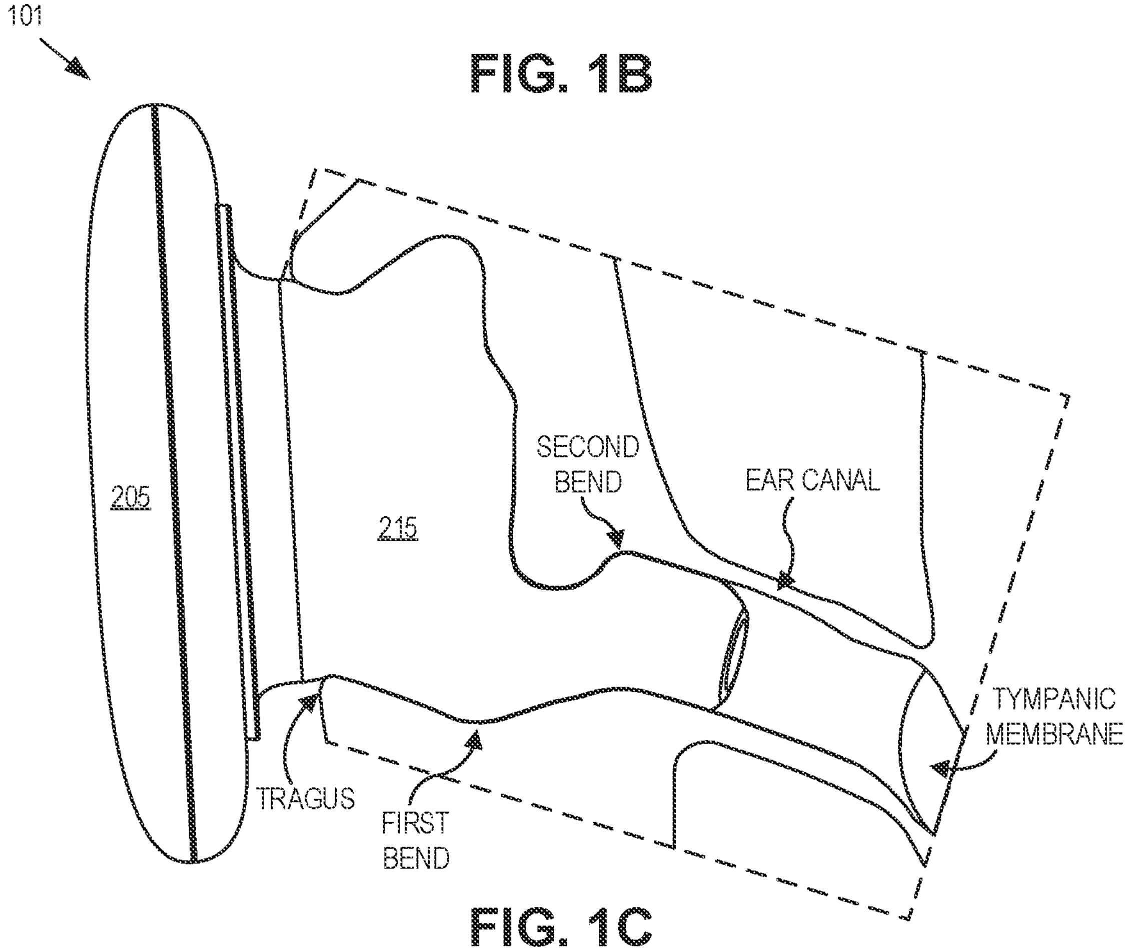
FIG. 1C is a side perspective illustration of the ear-mountable listening device when plugged into an ear canal, in accordance with an embodiment of the disclosure.

FIGS. 1A-1C illustrates a binaural listening system 100 including an ear-mountable listening device 101 when worn plugged into an ear canal, in accordance with an embodiment of the disclosure. The ear-mountable listening device 101 may be wirelessly coupled or otherwise paired with another instance of the ear-mountable listening device (not illustrated) to form the binaural listening system 100. In various embodiments, the ear-mountable listening device 101 (also referred to herein as an "ear device") is a device amenable to all day wearing and capable of facilitating a variety auditory functions including wirelessly connecting to (and/or switching between) a number of audio sources (e.g., Bluetooth connections to personal computing devices, etc.) to provide in-ear audio to the user, controlling the volume of the real world (e.g., modulated noise cancellation and transparency), providing speech hearing enhancements, localizing environmental sounds for spatially selective cancellation and/or amplification, and even rendering auditory virtual objects (e.g., auditory assistant or other data sources as speech or auditory icons). When the user desires to block out external environmental sounds, the mechanical design and form factor along with active noise cancellation and passive noise isolation can provide substantial external noise dampening (e.g., 40 to 50 dB). When the user desires a natural auditory interaction with their environment, ear-mountable listening device 101 can provide near (or perfect) perceptual transparency by reassertion of the user's natural Head Related Transfer Function (HRTF), thus maintaining spaciousness of sound and the ability to localize sound origination in the environment.

Figure 2:
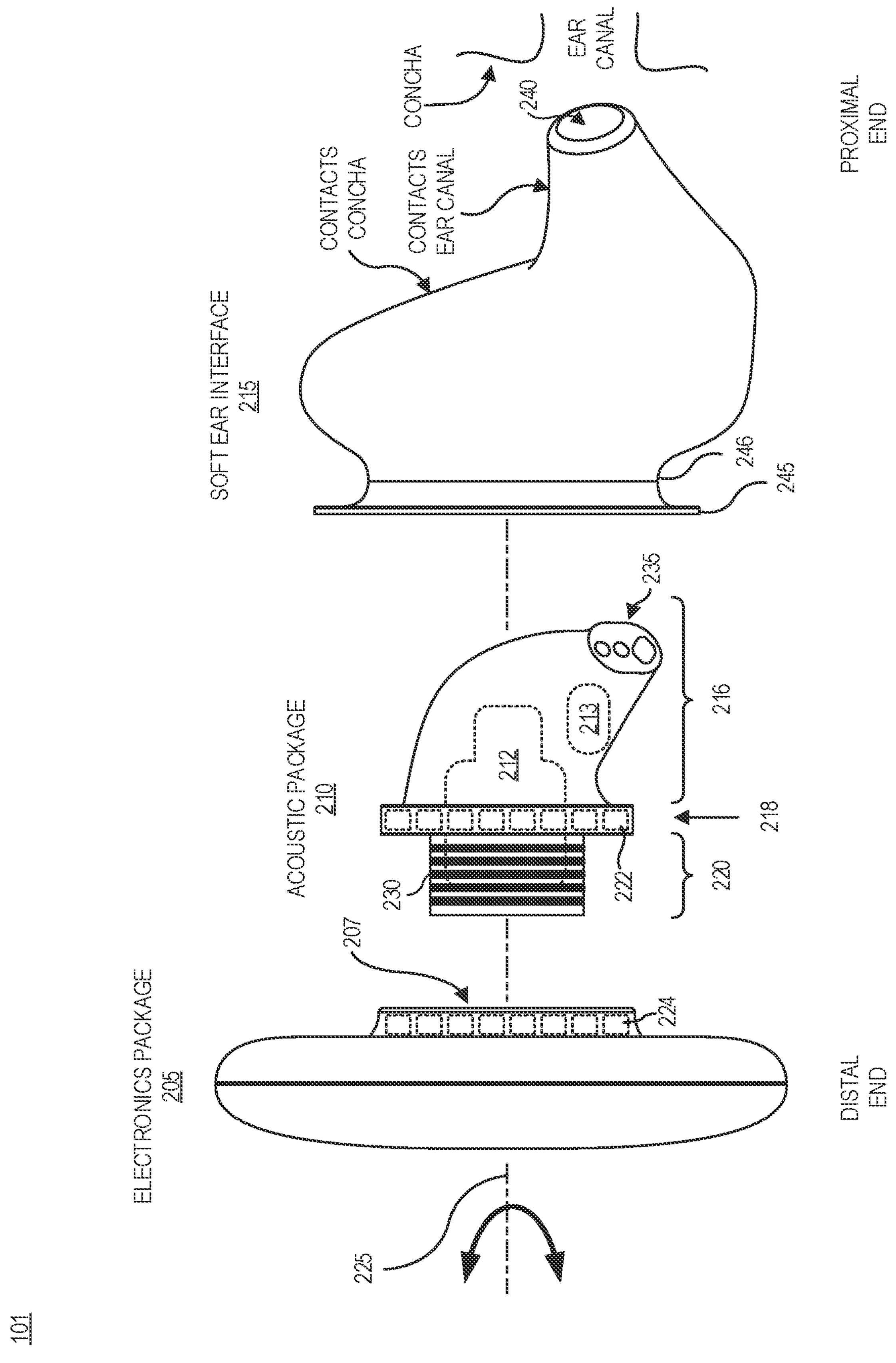
FIG. 2 is an exploded view illustration of the ear-mountable listening device with magnetic connector, in accordance with an embodiment of the disclosure.

FIG. 2 illustrates an exploded view of ear-mountable listening device 101 with magnetic connector, in accordance with an embodiment of the disclosure. As illustrated, ear-mountable listening device 101 has a modular design including an electronics package 205, an acoustic package 210, and a soft ear interface 215. The three components are separable by the end-user allowing for any one of the components to be individually replaced should it be lost or damaged, upgraded, or otherwise. The illustrated embodiment of electronics package 205 has a puck-like shape and includes an array of microphones for capturing external environmental sounds along with electronics disposed on a main circuit board for data processing, signal manipulation, communications, user interfaces, and sensing. In some embodiments, the main circuit board has an annular disk shape with a central hole to provide a compact, thin, or close-into-the-ear form factor. The electronics package 205 further includes a second set of magnets 224 to removably affix the electronics package 205 to the acoustic package 210 via magnetic forces (e.g., due to a first set of magnets 222 included in the acoustic package 210). In some embodiments, the electronics package 205 is rotatable about a central axis 225 of the ear-mountable listening device 101 to provide a rotary user interface.

The illustrated embodiment of acoustic package 210 includes multiple transducers or speakers 212, and in some embodiments, an internal microphone 213 for capturing user noises incident via the ear canal, along with electromechanical components of a rotary user interface (e.g., the second set of magnetics 222). The acoustic package 210 is shaped to include a cylindrical post 220, a shelf 218, and a tapered segment 216. The cylindrical post 220 is positioned proximate to or otherwise extends from a distal end of the acoustic package 210. The shelf 218 is shaped to house and/or hold the first set of magnets 222 and is disposed between the cylindrical post 220 and the tapered segment 216. The tapered segment 216 is disposed at a proximal end of the acoustic package 210 and is shaped with a variable width to fit within the soft ear interface 215 such that the acoustic package 215 is disposed, at least partially, in an ear canal when the ear-mountable device 101 is worn (e.g., to provide a more direct route to deliver audio to the ear). As illustrated, the cylindrical post 220 is positioned at the distal end of the acoustic package 210 and shaped to slide into and couple with a cylindrical port 207 on the proximal side of the electronics package 205. In embodiments where the main circuit board within electronics package 205 is an annular disk, cylindrical port 207 aligns with the central hole. The annular shape of the main circuit board and cylindrical port 207 facilitate a compact stacking of speakers 212 with the microphone array within electronics package 205 directly in front of the opening to the ear canal enabling a more direct orientation of speakers 212 to the axis of the auditory canal. Internal microphone 213 may be disposed within acoustic package 210 and electrically coupled to the electronics within electronics package 205 for audio processing (illustrated), or disposed within electronics package 205 with a sound pipe (not illustrated) plumbed through cylindrical post 220 and extending to one of the ports 235. Internal microphone 213 may be shielded and oriented to focus on user sounds originating via the ear canal. Additionally, internal microphone 213 may also be part of an audio feedback control loop for driving cancellation of the ear occlusion effect.

Post 220 may be held mechanically and/or magnetically in place while allowing electronics package 205 to be rotated about central axis 225 relative to acoustic package 210 and soft ear interface 215. This rotation of electronics package 205 relative to acoustic package 210 implements a rotary user interface. The mechanical/magnetic connection facilitates a plurality of detents (e.g., 4, 8, 16, 32 rotational detents or otherwise) that provide a force feedback as the user rotates electronic package 205 with their fingers. One or more electrical traces 230 (e.g., rings) extending circumferentially around post 220 provide electrical contacts for power and data signals communicated between electronics package 205 and acoustic package 210. More specifically, the one or more electrical traces 230 allow for the electronics package 205 and the acoustic package 210 to maintain electrical contact with one another even during rotation of the electronics package 205 about the central axis 225 (e.g., when the electronics package 205 is configured as a rotary user interface for the ear-mountable listening device 101). In some embodiments, post 220 may be eliminated in favor of using flat circular disks to interface between electronics package 205 and acoustic package 210.

Soft ear interface 215 is fabricated of a flexible material (e.g., silicone, flexible polymers, any other material or materials amenable to be at least partly compressible or flexible, or combinations thereof) and is shaped to contact or otherwise be inserted into a concha of the ear and external portion of the ear canal of the user to mechanically hold ear-mountable listening device 201 in place (e.g., via friction or elastic force fit). Soft ear interface 215 may be a custom molded piece (or fabricated in a limited number of sizes) to accommodate different concha and ear canal sizes/shapes. Soft ear interface 215 provides a comfortable fit while mechanically sealing the ear to dampen or attenuate direct propagation of external sounds into the ear canal. Soft ear interface 215 includes an internal cavity that is shaped to house one or more components (e.g., acoustic package 210) of the ear-mountable listening device 101 and securely holds the one or more components therein. In some embodiments, the specific shape of the cavity formed by the soft ear interface 215 aligns ports 235 with in-ear aperture 240 to deliver audio emitted from the acoustic package 210 to the ear. In some embodiments a flexible flange 245 seals soft ear interface 215 to the backside of electronics package 205 encasing acoustic package 210 and keeping moisture away from acoustic package 210. It is appreciated that in some embodiments, the electronics package 205 may still be free to rotate about the central axis 225 while the flexible flange 245 of the soft ear interface 225 encapsulates the acoustic package 210. Though not illustrated, in other embodiments, the distal end of acoustic package 210 may include a barbed ridge encircling ports 235 that friction fit or "click" into a mating indent feature within soft ear interface 215.

Referring back to FIG. 1A, which illustrates how ear-mountable listening device 101 is held by, mounted to, or otherwise disposed in the user's ear. As illustrated, soft ear interface 215 is shaped to hold ear-mountable listening device 101 with central axis 225 substantially falling within (e.g., within 20 degrees) a coronal plane 104. As is discussed in greater detail below, an array of microphones extends around central axis 225 in a ring pattern that substantially falls within a sagittal plane 106 of the user. When ear-mountable listening device 101 is worn, electronics package 205 is held close to the pinna of the ear and aligned along, close to, or within the pinna plane. Holding electronics package 205 close into the pinna not only provides a desirable industrial design (relative to further out protrusions), but may also have less impact on the user's HRTF or more readily lend itself to a definable/characterizable impact on the user's HRTF, for which offsetting calibration may be achieved. As mentioned, the central hole in the main circuit board along with cylindrical port 207 facilitate this close in mounting of electronics package 205 despite mounting speakers 212 directly in front of the ear canal in between electronics package 205 and the ear canal along central axis 225. As mentioned, although electronics package 205 sits close to the pinna when the ear-mountable listening device 101 is worn, the user is still able to provide one or more input commands by at least rotation of the electronics package 205 with respect to the acoustic package 210 and/or soft ear interface 215 (see, e.g., FIG. 1B).

Referring to FIG. 1C, when the ear-mountable listening device 101 is worn (e.g., inserted, at least partially, into an ear canal), the soft ear interface 215 extends beyond the first and second bends of the ear canal, which provides an acoustic seal of the ear canal. The conformal fit of the soft ear interface 215 provides sufficient friction to hold the ear-mountable listening device 101 in a fixed position within the ear. Consequently, the acoustic package 210 (see, e.g., FIG. 2) inserted into the soft ear interface 215 is also fixed in place, which then in turn holds the electronic package 205 in place via magnetic forces (e.g., the first set of magnets disposed within the acoustic package 210 and the second set of magnets disposed within the electronics package 205). It is appreciated that the soft sear interface 215 may have a custom shape specifically tailored to substantially match a corresponding shape of the ear (e.g., including the concha and ear canal) of the wearer of the ear-mountable listening device 101. By having an overall shape tailored to the specific geometry of an individual user's ear the soft ear interface provides a conformal fit to the ear and holds the ear-mountable listening device 101 in place. It is appreciated that in some embodiments, the soft ear interface 215 may not extend beyond the second bend of the ear canal or even the first bend of the ear canal depending on a configuration of the soft ear interface 215 or more generally the ear-mountable listening device 101.

Figure 3:
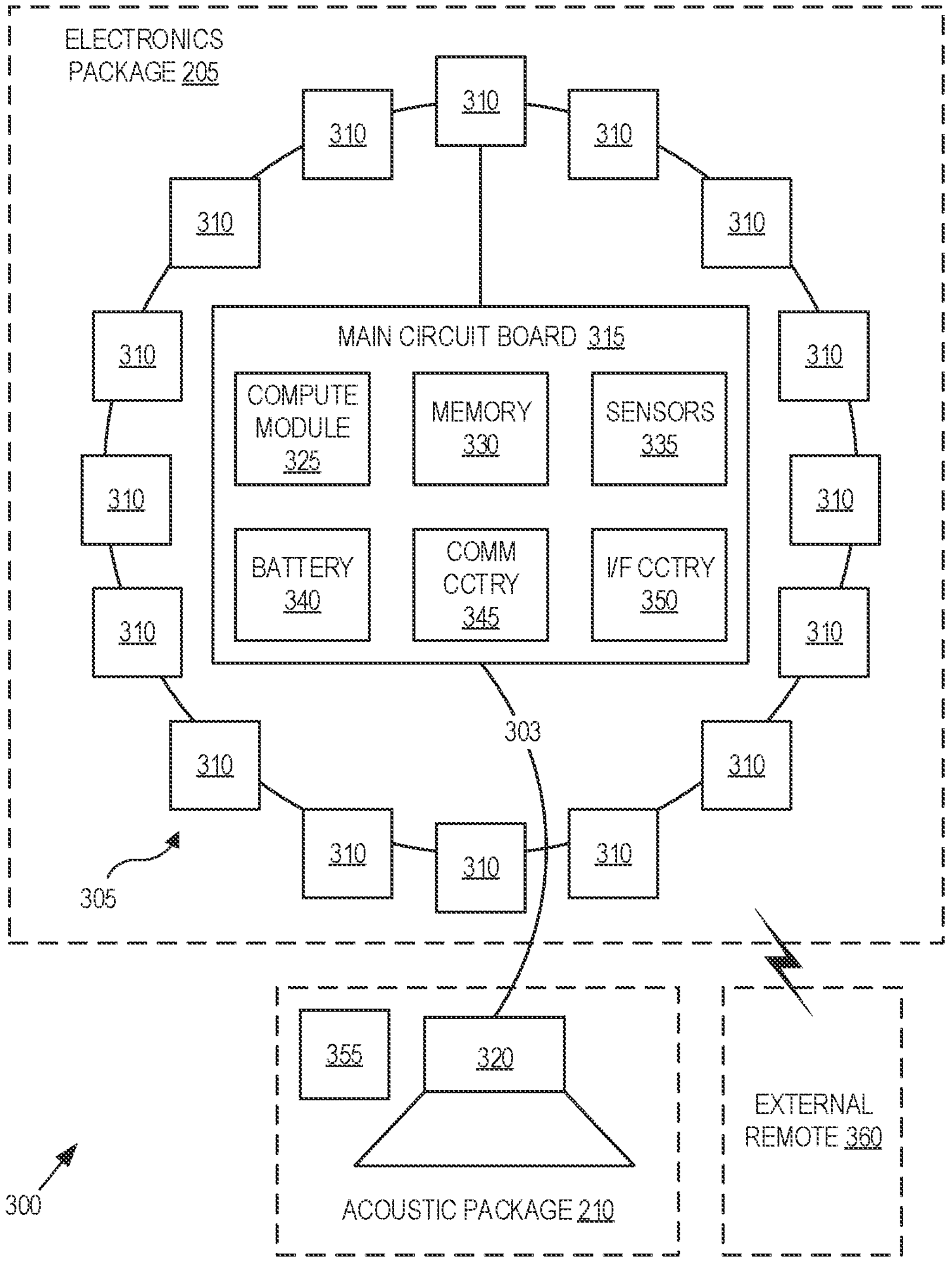
FIG. 3 is a block diagram illustrating select functional components of the ear-mountable listening device, in accordance with an embodiment of the disclosure.

FIG. 3 is a block diagram illustrating select functional components 300 of the ear-mountable listening device 101, in accordance with an embodiment of the disclosure. The functional components 300 are one possible implementation of ear-mountable listening device 101 illustrated in FIGS. 1A-1C and ear-mountable listening device 201 illustrated in FIG. 2. In the illustrated embodiment of FIG. 3, the functional components 300 include an adaptive phased array 305 of microphones 310 and a main circuit board 315 disposed within electronics package 205 and speaker 320 (e.g., one or more electroacoustic transducers, one or more balanced armatures, or other sound emitting component) are disposed within acoustic package 205. Main circuit board 315 includes various electronics disposed thereon including a compute module 325, memory 330, sensors 335, battery 340, communication circuitry 345, and interface circuitry 350. The illustrated embodiment also includes an internal microphone 355 disposed within acoustic package 205. An external remote 360 (e.g., handheld device, smart ring, etc.) may be wirelessly coupled to ear-mountable listening device 101 (or binaural listening system 100) via communication circuitry 345. Although not illustrated, acoustic package 205 may also include some electronics for digital signal processing (DSP), such as a printed circuit board (PCB) containing a signal decoder and DSP processor for digital-to-analog (DAC) conversion and EQ processing, a bi-amped crossover, and various auto-noise cancellation and occlusion processing logic.

In one embodiment, microphones 310 are arranged in a ring pattern (e.g., circular array, elliptical array, etc.) around a perimeter of main circuit board 315. Circuit board 315 itself may have a flat disk shape, and in some embodiments, is an annular disk with a central hole. In the case of a binaural listening system, protrusion of electronics package 205 may extend significantly out past the pinna plane and may even distort the natural time of arrival of the sounds to each ear and further distort spatial perception and the user's HRTF potentially beyond a calibratable correction. Fashioning the disk as an annulus (or donut) enables protrusion of the driver of speaker 320 (or speakers 212) through main circuit board 315 and thus allows a more direct orientation/alignment of speaker 320 with respect to the entrance of the auditory canal.

Microphones 310 may each be disposed on their own individual microphone substrates. The microphone port of each microphone 310 may be spaced in substantially equal angular increments about central axis 225. In FIG. 3, sixteen microphones 310 are equally spaced; however, in other embodiments, more or less microphones may be distributed (evenly or unevenly) in the ring pattern about central axis 225.

Compute module 325 orchestrates operation of the ear-mountable listening device 101 and may include a programmable microcontroller that executes software/firmware logic stored in memory 330, hardware logic (e.g., application specific integrated circuit, field programmable gate array, etc.), or a combination of both. Although FIG. 3 illustrates compute module 325 as a single centralized resource, it should be appreciated that compute module 325 may represent multiple compute resources disposed across multiple hardware elements on main circuit board 315 and which interoperate to collectively orchestrate the operation of the other functional components. For example, compute module 325 may execute logic to turn ear-mountable listening device 101 on/off, monitor a charge status of battery 340 (e.g., lithium ion battery, etc.), pair and unpair wireless connections, switch between multiple audio sources, execute play, pause, skip, and volume adjustment commands received from interface circuitry 350, commence multi-way communication sessions (e.g., initiate a phone call via a wirelessly coupled phone), control volume of the real-world environment passed to speaker 320 (e.g., modulate noise cancellation and perceptual transparency), enable/disable speech enhancement modes, enable/disable smart volume modes (e.g., adjusting max volume threshold and noise floor), or otherwise. In some embodiments, compute module 325 may operably configure (e.g., variably power) a plurality of electroacoustic transducers (e.g., loudspeakers, tweeters, woofers, and/or combinations thereof) included in the acoustic package 210 to emit audio in response to an audio signal 303 (e.g., from one or more audio sources).

Sensors 335 may include a variety of sensors such as an inertial measurement unit (IMU) including one or more of a three axis accelerometer, a magnetometer (e.g., compass), or a gyroscope. In some embodiments, an output of the sensors 335 may be monitored by compute module 325 to determine an instantaneous angular position or a change in angular position of the electronics package 205 with respect to a reference (e.g., acoustic package 210 in a fixed position, gravity vector, or otherwise) based on the output of at least one of the sensors 335. For example, a first sensor included in sensors 335 of electronics package 205 and/or an unillustrated sensor disposed within the acoustic package 210 may be utilized by compute module 325 to determine the angular position of the electronics package 205 about the central axis 225 relative to the acoustic package 210. In some embodiments, the logic includes a machine learning model trained to receive the output of the sensors 335 as an input. In response to receiving the input, the machine learning model outputs an instantaneous angular position of the electronics package 205 and/or a change in angular position of the electronics package 205 to a reference (e.g., a previous angular position of the electronics package 205). Communication interface 345 may include one or more wireless transceivers including near-field magnetic induction (NFMI) communication circuitry and antenna, ultra-wideband (UWB) transceivers, a WiFi transceiver, a radio frequency identification (RFID) backscatter tag, a Bluetooth antenna, or otherwise. Interface circuitry 350 may include a capacitive touch sensor disposed across the distal surface of electronics package 205 to support touch commands and gestures on the outer portion of the puck-like surface, as well as a rotary user interface (e.g., rotary encoder) to support rotary commands by rotating the puck-like surface of electronics package 205. A mechanical push button interface operated by pushing on electronics package 205 may also be implemented.

Figure 4B:
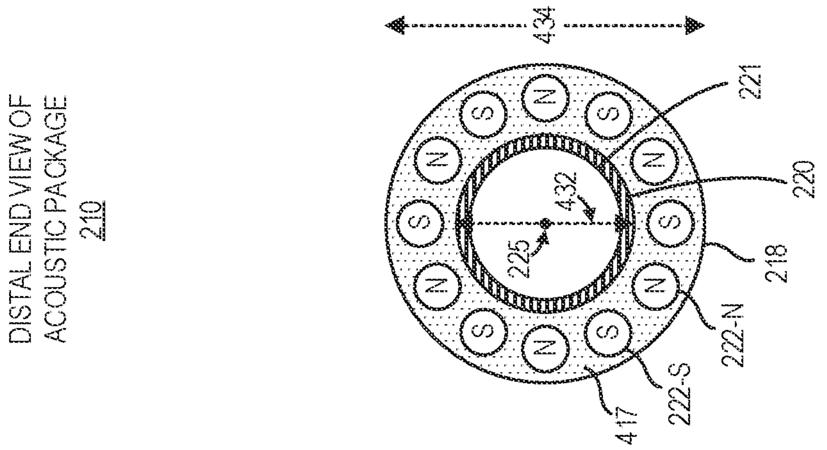
FIG. 4B illustrates a distal end view of an example acoustic package with magnetic connector, in accordance with an embodiment of the disclosure.
Figure 4A:
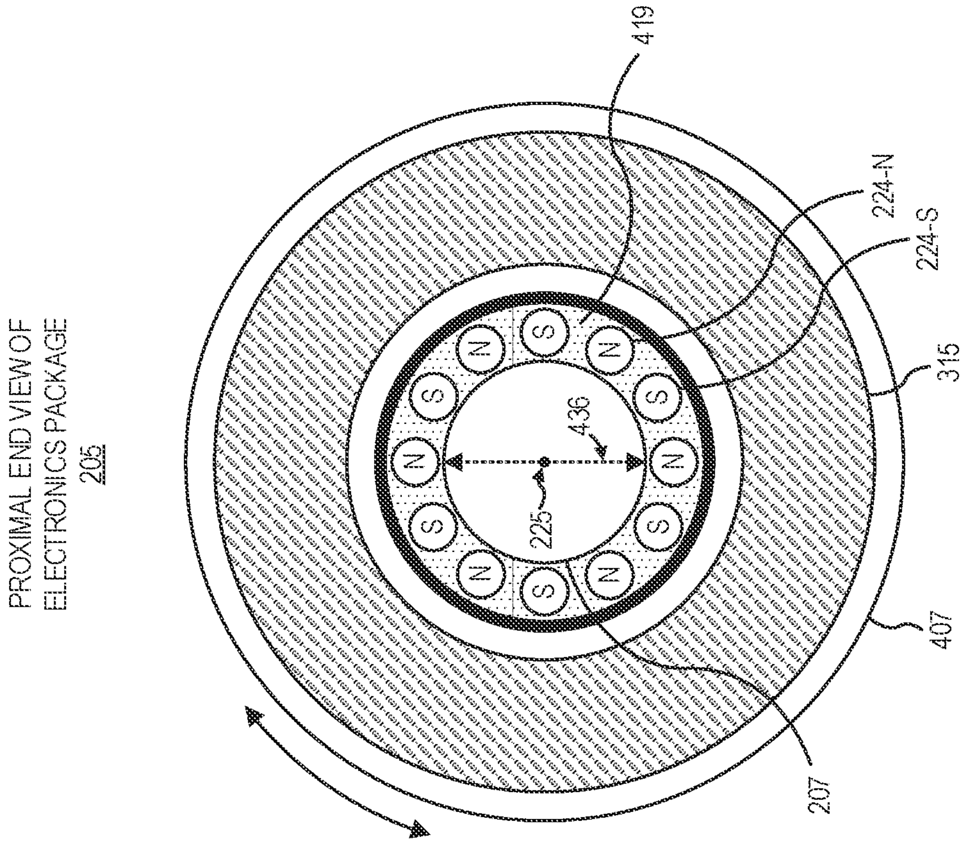
FIG. 4A illustrates a proximal end view of an example electronics package with magnetic connector, in accordance with an embodiment of the disclosure.

FIG. 4A and FIG. 4B respectively illustrate a proximal end view of electronics package 205 and a distal end view of acoustic package 210, which collectively form a magnetic connector. It is appreciated that the terms "proximal" and "distal" are described in relation to proximity to a wearer of the ear-mountable listening device 101. More specifically, a proximal end of a given element (e.g., electronics package 205, acoustic package 210, soft ear interface 215, or the like) is closer to the ear than a corresponding distal end of the given element when the ear-mountable listening device 101 is worn. For example, the proximal end of the electronics package 205 is closer to the ear than a distal end (e.g., the surface of electronics package 205 that may incorporate a button and/or touch sensitive interface) of the electronics package 205.

In the illustrated embodiment, the acoustic package 210 includes a first set of magnets 222 arranged annularly (e.g., as a ring to form an annulus) about the central axis 225 of the ear-mountable listening device 101. Similarly, the electronics package 205 includes a second set of magnets 224 arranged annularly about the central axis 225 proximate to the proximal end of the electronics package 205 to removably affix the electronics package 205 to the acoustic package 210 via magnetic forces between the first set of magnets 222 and the second set of magnets 224 when the ear-mountable listening device 101 is worn. More specifically, the acoustic package 210 is shaped to include the cylindrical post 220 extending from the distal end of the acoustic package 210 towards the shelf 218 of the acoustic package. The cylindrical post 220 has a first width 432 and the shelf 218 has a second width 434 greater than the first width 432 such that the shelf 218 is proud of the cylindrical post 220. In contrast, the proximal end of the electronics package 205 includes a cylindrical port 207 with a third width 436 of sufficient dimension such that the cylindrical post 220 fits within the cylindrical port 207 to support rotation of the electronics package 205 about the central axis 225 with respect to the acoustic package 201 (e.g., to provide a rotary user interface of the ear-mountable listening device 101). It is appreciated that the first set of magnets 222, which are disposed in or on the shelf 218, forms a first surface 417 of the acoustic package 210. The second set of magnets 224 forms a second surface 419 of the electronics package 205. The first surface 417 and the second surface 419 are shaped to overlap with one another when the ear-mountable listening device 101 is worn. Additionally, in some embodiments, the first surface 417 is shaped to have conformal contact with the second surface 419 when the ear-mountable listening device 101 is worn such that the first set of magnets 222 and the second set of magnets 224 overlap with one another.

To facilitate the magnetic forces between the first set of magnets 222 and the second set of magnets 224 removably affixing the acoustic package 210 to the electronics package 205, the first set of magnets 222 comes into contact (directly or indirectly) with the second set of magnets 224 when the cylindrical post 220 is inserted into the cylindrical port 207. The first set of magnets 222 and the second set of magnets 224 are collectively structured to have alternating surface polarities such that an attractive or repulsive magnetic force acts between the electronics package 205 and the acoustic package 210 depending on the relative polarity alignment between the first set of magnets 222 and the second set of magnets 224 (see, e.g., FIG. 4C). In the illustrated embodiment, the first set of magnets 222 and the second set of magnets 224 are structured to have alternating surface polarities (e.g., represented by "N" and "S" surfaces) arranged symmetrically about the central axis 225 to form the rotary user interface of the ear-mountable listening device 101 via rotation (e.g., clockwise or counter-clockwise) of the electronics package 205 about the central axis 225 with respect to the acoustic package 210. In the illustrated embodiment the first set of magnets 222 and the second set of magnets 224 each contain an equal number of individual magnets that is greater than or equal to four (e.g., 4, 8, 16, 32, or otherwise). However, it is appreciated that in other embodiments the first set of magnets 222 and the second set of magnets 224 may not have an equal number of individual magnets. In the illustrated embodiment, the first set of magnets 222 and the second set of magnets 224 each include a plurality of individual magnets that are distinct and separate from one another. The individual magnets may directly or indirectly contact one another and be arranged to respectively form the first set of magnets 222 and/or the second set of magnets 224 with corresponding alternating surface polarities. However, in other embodiments, the first set of magnets 222 and/or the second set of magnets 224 may be monolithic structures (e.g., a continuous magnetic strip) with a variable surface polarity that replicates the arrangement of individual magnets.

In some embodiments, the acoustic package 210 and/or the electronics package 205 include one or more sensors (e.g., sensors 335 illustrated in FIG. 3) for determining an angular position of the electronics package 205 relative to the acoustic package 210 when the electronics package 205 is rotated about the central axis 225 (e.g., to register and/or implement a rotary command input by a user). In the same or other embodiments, the one or more sensors may be disposed on the main circuit board 315 disposed within a housing 407 of the electronics package 205.

It is appreciated that in some embodiments, the cylindrical post 220 may be a solid post with a thickness extending the first width 225. However, in other embodiments the thickness of cylindrical post 220 may not extend the entirety of first width 225 and instead may form an opening 221 (e.g., as illustrated in FIG. 4B). The opening 221 may provide a vent for the acoustic package 210 (e.g., to increase low frequency response of one or more electroacoustic transducers included in the acoustic package 210).

Figure 4C:
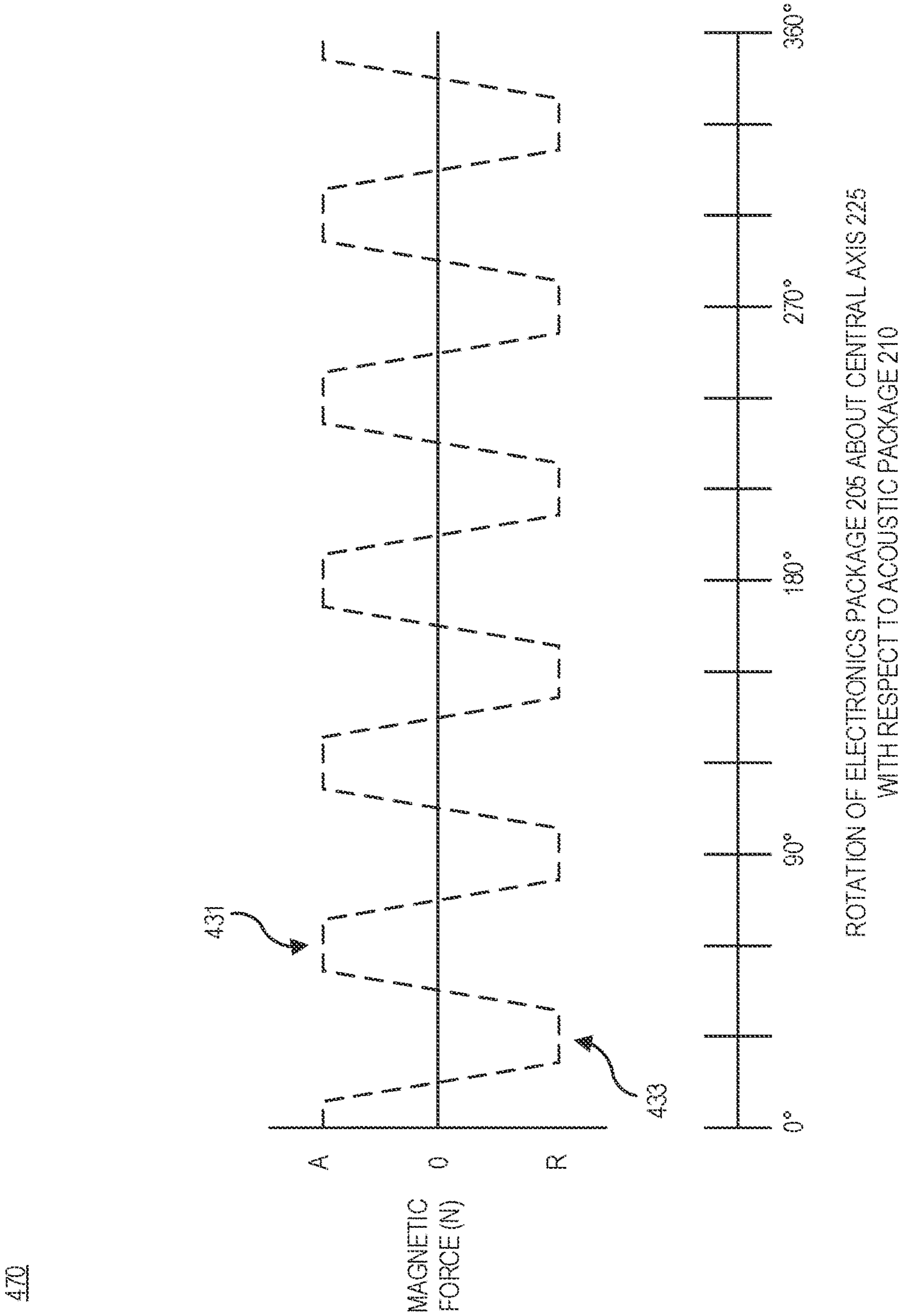
FIG. 4C illustrates an example graph describing magnetic force between an electronics package and an acoustic package as the electronics package is rotated about a central axis of an ear-mountable listening device, in accordance with an embodiment of the disclosure.

FIG. 4C illustrates an example graph 470 describing the magnetic force between the electronics package 205 and the acoustic package 210 as the electronics package 205 is rotated about the central axis 225 of the ear-mountable listening device 101, in accordance with an embodiment of the disclosure. More specifically, the alternating surface polarities of the first set of magnets 222 and the second set of magnets 224 illustrated in FIG. 4A and FIG. 4B cause the rotary interface to include a plurality of detents. For example, when a user rotates the electronics package 205 about the central axis 225 the electronics package 205 will be attracted to or repelled from the acoustic package 210 depending on which types of surface polarities are interacting with one another. For example, when the electronics package 205 is rotated such that the north ("N") pole surfaces of the second set of magnets 224 overlap with the south ("S") pole surfaces of the first set of magnets 222, then the electronics package 205 is magnetically attracted to the acoustic package 210 and fixed in place with an amount of force similar to a level of magnetic force of attraction. Conversely, when the electronics package 205 is rotated such that the south pole surfaces of the second set of magnets 224 overlap with the south pole surfaces of the first set of magnets 222 and/or the north pole surfaces of the second set of magnets 224 overlap with the north pole surfaces of the first set of magnets 222, then the electronics package 205 is magnetically repelled from the acoustic package 210. It is appreciated that the magnetic forces between the first set of magnets 222 and the second set of magnets 224 result in the rotary user interface having a plurality of detents corresponding to haptic or force feedback experienced by a user rotating the electronics package 205.

Referring back to FIG. 4C, chart 470 illustrates an example graph of the magnetic force between the electronics package 205 and the acoustic package 210 as the electronics package 205 is rotated about the central axis 225. As discussed above, the alternating surface polarities of the first set of magnets 222 and the second set of magnets 224 correspond to transitions between north and south polarities at the first surface 417 of the acoustic package 210 or the second surface 419 of the electronics package 205. The total number of detents included in the plurality of detents is based on a quantity of the transitions (e.g., as shown in FIGS. 4A and 4B, the first set of magnets 222 and the second set of magnets 224 each have twelve individual magnets, which results in six transitions between north and south polarities). In some embodiments, there are at least two detents per complete rotation of the electronics package 205 included in the plurality of detents. However, in the illustrated embodiments there are six detents 431 experienced by the user of the ear-mountable listening device 101 as the electronics package 205 is rotated a complete rotation about the central axis 225. It is appreciated that when common polarity surfaces of the first set of magnets 222 and the second set of magnets 224 overlap (e.g., repulsive detent 433), the repulsive force may cause the electronics package 205 to snap to an adjacent position where opposite polarity surfaces overlap.

Figure 5B:
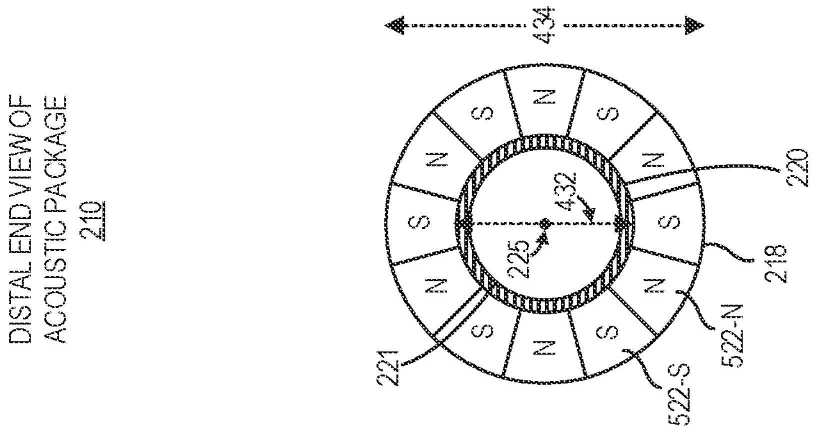
FIG. 5B illustrates a distal end view of an example acoustic package with magnetic connector, in accordance with an embodiment of the disclosure.
Figure 5A:
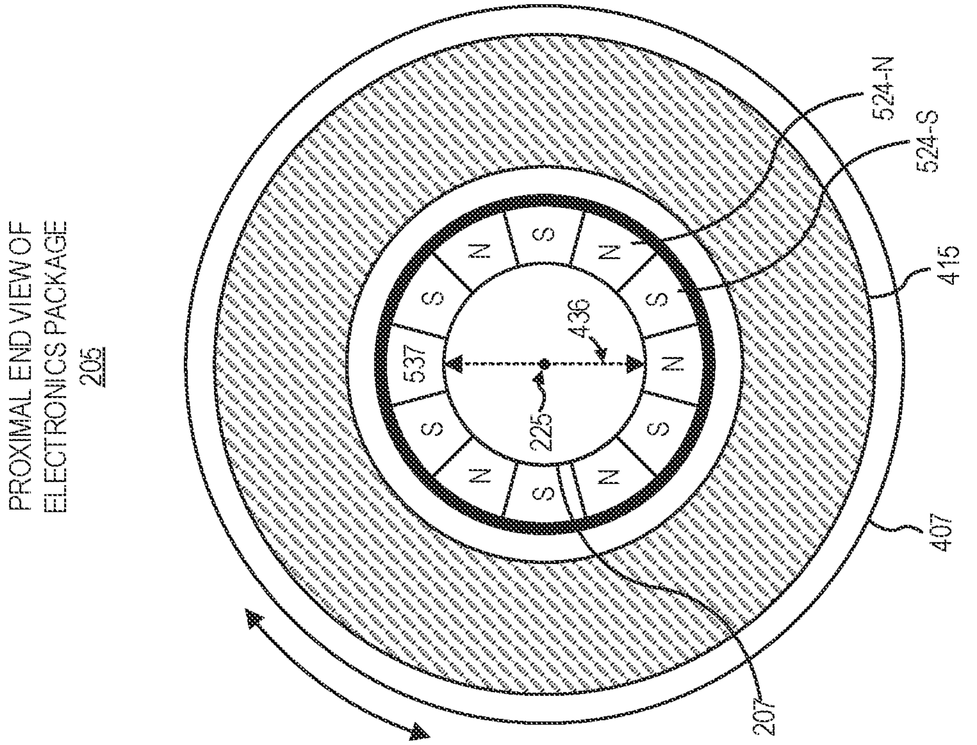
FIG. 5A illustrates a proximal end view of an example electronics package with magnetic connector, in accordance with an embodiment of the disclosure.

FIG. 5A and FIG. 5B respectively illustrate a proximal end view of electronics package 205 and a distal end view of acoustic package 210, which collectively form a magnetic connector. The magnetic connector illustrated in FIGS. 5A and 5B is an alternative implementation in which individual magnets included in a first set of magnets 522 of the acoustic package 210 and a second set of magnets 524 of the electronics package 205 are shaped and arranged differently relative to that of FIG. 4A and FIG. 4B. For example, individual magnets included in the first set of magnets 522 and the second set of magnets 524 illustrated in FIG. 5A and FIG. 5B directly contact one another and have trapezoidal shapes. In contrast, the first set of magnets 422 and the second set of magnets 424 illustrated in FIGS. 4A and 4B do not directly contact one another and have circular shapes.

Additionally, in the embodiment illustrated by FIG. 5A and FIG. 5B, the first set of magnets 522 does not have an equal number of magnets relative to the second set of magnets 524. Instead, FIG. 5B shows that the electronics package 205 includes at least one sensor 537, which may be a magnetometer or another type of sensor for determining an angular position of the electronics package 205. More specifically, sensor 537 may measure or otherwise detect the alternating surface polarities of the first set of magnets 522 as the electronics package 205 rotates about the central axis 225. In such an embodiment, the sensor 537 may be utilized to count the number of transitions or detents that the electronics package 205 is rotate (e.g., change in angular position over a first time period) to register a rotary command issued by a user using the rotary interface.

Figure 5C:
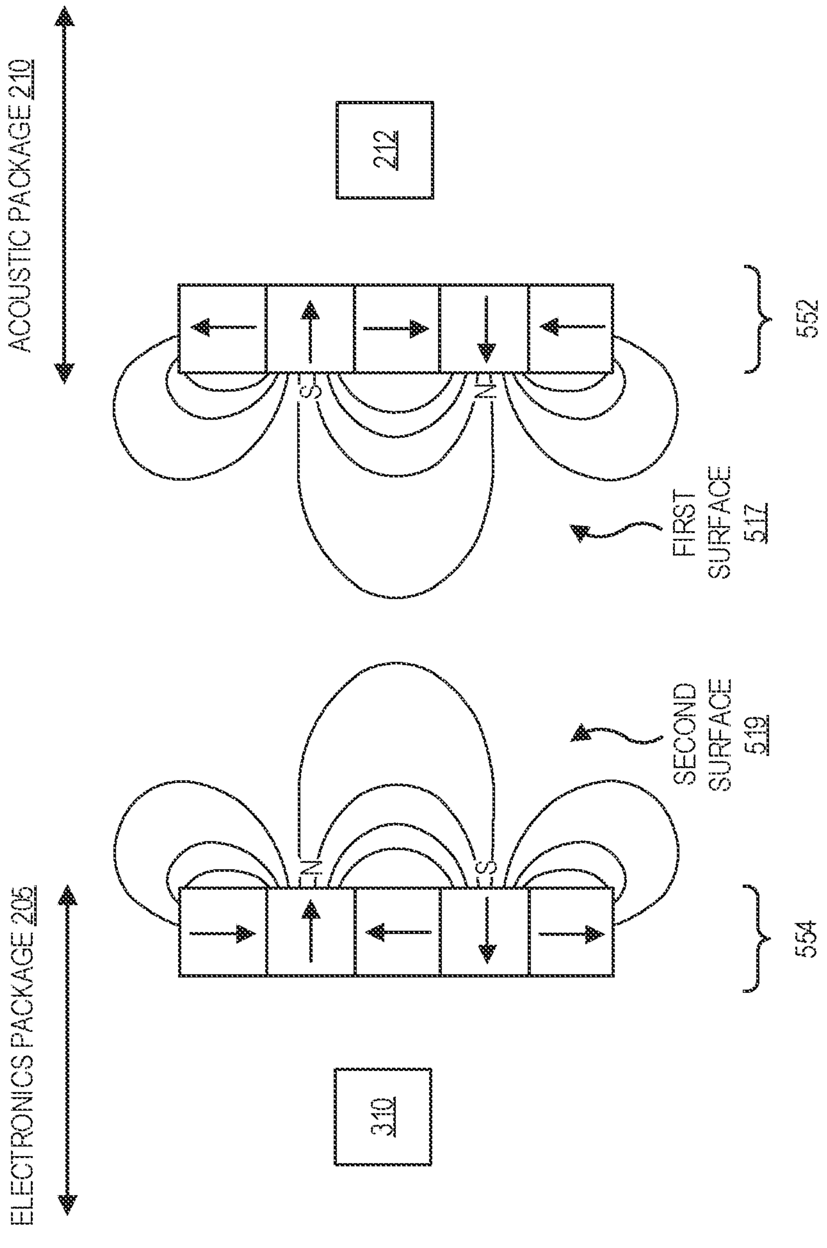
FIG. 5C illustrates an example one-sided magnetic flux arrangement of a first set of magnets and a second set of magnets for a magnetic connector of an electronics package and an acoustic package of an ear-mountable listening device, in accordance with an embodiment of the disclosure.

FIG. 5C illustrates an example one-sided magnetic flux arrangement of a first set of magnets 552 of the acoustic package 210 and a second set of magnets 554 of the electronics package 205 for a magnetic connector implementable in the ear-mountable listening device 101, in accordance with an embodiment of the disclosure. In the illustrated embodiment, the electronics package 205 includes one or more microphones 310 and the acoustic package 210 includes one or more electroacoustic transducers 212. However, a rotary interface with magnets (e.g., first set of magnets 422, 522 and/or second set of magnets 424, 524) arranged as illustrated in FIG. 4A, FIG. 4B, FIG. 5A, and FIG. 5B is utilized, the magnetic field generated by magnets may interfere with the electroacoustic properties of the one or more microphones of the electronics package 205, the one or more electroacoustic transducers 212 of the acoustic package, or other components of the ear-mountable listening device 101. In some embodiments, the interference may be mitigated by utilizing an alternate magnet arrangement such as Holbach array to substantially confine magnetic flux away from sensitive components.

As shown in FIG. 5C, the first set of magnets 552 and the second set of magnets 554 are each structured to substantially confine magnetic flux from the first set of magnets 552 and the second set of magnets 554 to the first surface 517 of the acoustic package 210 and the second surface 519 of the electronics package 205, respectively. The magnetic flux is confined to an individual side by incorporating an additional magnet between the alternating magnet polarities. For example, an additional magnet may be placed between each of the alternating surface polarities (e.g., N-S and/or S-N transitions) of the first set of magnets 552 and the second set of magnets 554 as illustrated in FIG. 5C. In the illustrated embodiment, the north and south poles of the additional magnet are oriented perpendicular to the first surface 517 and the second surface 519 to substantially reduce the magnetic field opposite of the first surface 517 and the second surface 519. In such embodiments the first surface 517 of acoustic package 210 is positioned to face the second surface 519 of the electronics package 205 when the ear-mountable listening device 101 is worn such that the one or more microphones 310 of the electronic package 205 and the one or more electroacoustic transducers 212 of the acoustic package 210 are not influenced by the magnetic flux.

Figure 6A:
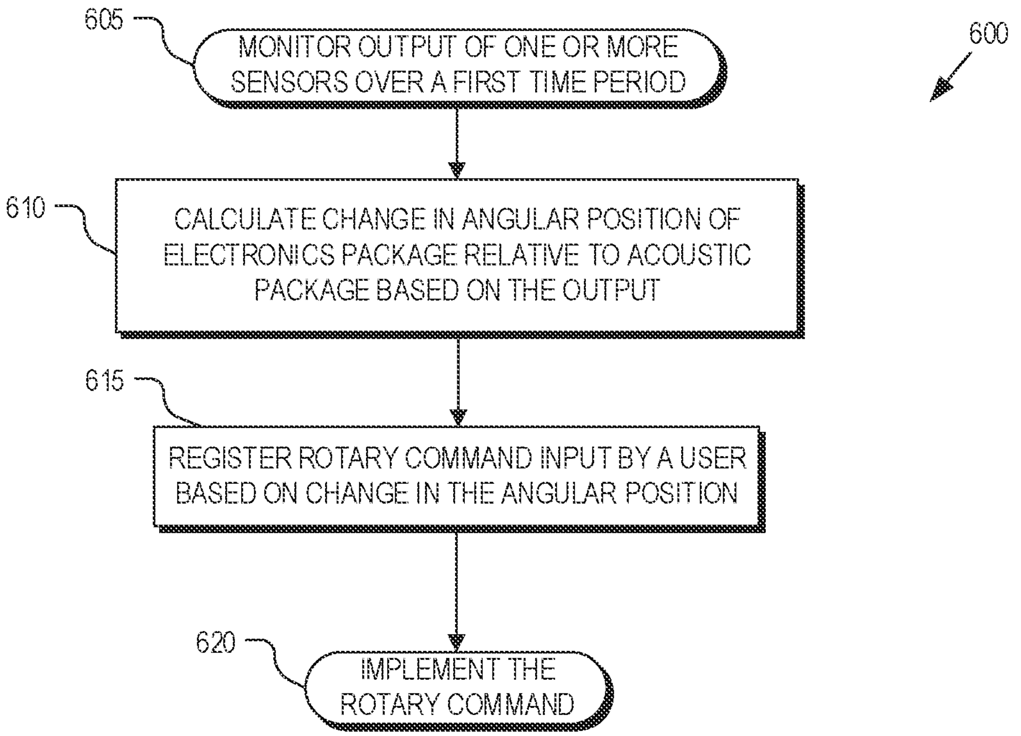
FIG. 6A illustrates a flow chart for operation of a rotary user interface of an ear-mountable listening device with a magnetic connector, in accordance with an embodiment of the disclosure.

FIG. 6A illustrates a flow chart 600 for operation of a rotary user interface of an ear-mountable listening device with a magnetic connector, in accordance with an embodiment of the disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

Block 605 illustrates monitoring the output of one or more sensors (e.g., a first sensor included in the sensors 335 illustrated in FIG. 3, sensor 537 illustrated in FIG. 5A, or otherwise) over a first period of time. The one or more sensors may be a magnetometer, an accelerometer, or a gyroscope that is disposed in or on the electronics package 205 and/or the acoustic package 210. In some embodiments, the output of the one or more sensors may be monitored when the ear-mountable listening device 101 is mounted or otherwise inserted in an ear. In the same or other embodiments, the output of the one or more sensors may be monitored for a pre-determined period of time (e.g., to periodically update a reference position of the electronics package 205).

Block 610 shows calculating a change in angular position associated with a rotation of the electronics package 205 based, at least in part, on the output of the one or more sensors (e.g., the first sensor). In one embodiment, the output of a 3-axis accelerometer could be utilized to determine the extent a user rotates the electronics package 205. In the same or another embodiment, a magnetometer could be utilized to track how many detents the user rotates the electronics package 205. In another embodiment, a machine learning model could be utilized to provide sensor fusion (see, e.g., FIG. 6B) and calculate the change in angular position over the first period of time. In some embodiments, instantaneous angular position of the electronics package 205 may be calculated, which may be compared to a previous determination of instantaneous angular position of the electronics package 205 to determine the change in the angular position.

Block 615 illustrates registering a rotary command input by a user of the ear-mountable listening device 101 based on the change in the angular position of the electronics package 205 relative to the acoustic package 210 during the first period of time. The rotary command input may be registered based on an extent the electronics package 205 rotates. In the same or other embodiments, a current state of the ear-mountable listening device 101 may also be considered when registering a rotary command. Depending on the mode of operation of the ear-mountable listening device 101, criteria for registering an input or rotation of the electronics package 205 as a command may change.

Block 620 shows implementing the rotary command by adjusting the audio emitted by the ear-mountable listening device 101. In some embodiments, adjusting of the audio includes at least one of increasing a volume of the audio, decreasing the volume of the audio, initiating a playback of the audio, or terminating the playback of the audio. Additional rotary input commands may include pair and unpair wireless connections, switch between multiple audio sources, execute play, pause, skip, and volume adjustment commands received from interface circuitry 350, commence multi-way communication sessions (e.g., initiate a phone call via a wirelessly coupled phone), control volume of the real-world environment passed to speaker 320 (e.g., modulate noise cancellation and perceptual transparency), enable/disable speech enhancement modes, enable/disable smart volume modes (e.g., adjusting max volume threshold and noise floor), or otherwise.

Figure 6B:
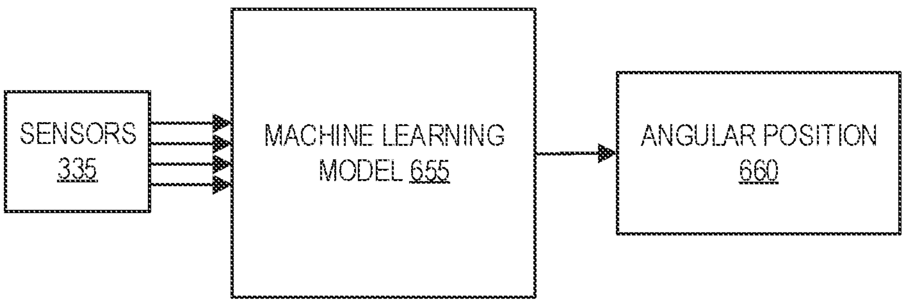
FIG. 6B illustrates a machine learning model trained to output an angular position of an electronics package in response to receiving outputs from a plurality of sensors, in accordance with an embodiment of the disclosure.

FIG. 6B illustrates a machine learning model 655 trained to output an angular position of an electronics package 205 in response to receiving outputs from a plurality of sensors 335, in accordance with an embodiment of the disclosure. Machine learning model 655 may be a neural network trained to use the plurality of sensors 335 to collectively determine a change in angular position of the electronics package 205 about the central axis 225 relative to the acoustic package 210 based on the rotation. The output of the plurality of sensors are provided as an input to the machine learning model 665, which then outputs the angular position of the electronics package with respect to the acoustic package in response. Advantageously, the machine learning model 655 may receive noisy sensor outputs or data that is individually inaccurate enough to determine the change in angular position, and in combination with multiple sensor outputs provide the angular position of the electronics package 205.

The processes explained above are described in terms of computer software and hardware. The techniques described may constitute machine-executable instructions embodied within a tangible or non-transitory machine (e.g., computer)

readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An ear-mountable listening device, comprising:

an acoustic package configured to emit audio in response to an audio signal, wherein the acoustic package includes a first set of magnets; and an electronics package electrically coupleable to the acoustic package to provide the audio signal to the acoustic package, wherein the electronics package includes a second set of magnets, wherein the first set of magnets and the second set of magnets are configured to magnetically couple the electronics package to the acoustic package via magnetic forces between the first set of magnets and the second set of magnets, wherein the first set of magnets and the second set of magnets allow for a rotary user interface for the ear-mountable listening device via rotation of the electronics package with respect to the acoustic package, wherein at least one of the electronics package and the acoustic package further includes a sensor that may be utilized to determine an angular position of the electronics package relative to the acoustic package, and wherein at least one of the electronics package and the acoustic package further includes a controller electrically coupled to the sensor to calculate a change in the angular position due to the rotation based, at least in part, on an output of the sensor.

2. The ear-mountable listening device of claim 1 wherein the controller is electrically coupled to logic that, when executed by the controller, causes the ear-mountable listening device to perform operations, including:

monitoring the output of the sensor over a first period of time;

calculating the change in the angular position based, at least in part, on the output of the sensor; and registering a rotary command input by a user based on the change in the angular position of the electronics package relative to the acoustic package during the first period of time.

3. The ear-mountable listening device of claim 2 wherein the controller is electrically coupled to additional logic that, when executed by the controller, causes the ear-mountable listening device to perform further operations including implementing the rotary command input by adjusting the audio emitted by the ear-mountable listening device.

4. The ear-mountable listening device of claim 1 wherein at least one of the first set of magnets and the second set of magnets is a monolithic structure.

5. The ear-mountable listening device of claim 1 wherein each of the first set of magnets and the second set of magnets has alternating surface polarities about a central axis of the ear-mountable listening device.

6. The ear-mountable listening device of claim 5 wherein the alternating surface polarities are symmetric about the central axis.

7. The ear-mountable listening device of claim 1 wherein at least one of the first set of magnets and the second set of magnets includes a number of individual magnets that is greater than or equal to four.

8. The ear-mountable listening device of claim 1 wherein the first set of magnets forms a first surface of the acoustic package, wherein the second set of magnets forms a second surface of the electronics package, and wherein the first surface is shaped to have conformal contact with the second surface when the ear-mountable listening device is worn.

9. The ear-mountable listening device of claim 8 wherein the first set of magnets is structured to substantially confine magnetic flux from the first set of magnets to the first surface of the acoustic package and wherein the second set of magnets is structured to substantially confine magnetic flux from the second set of magnets to the second surface of the electronics package.

10. The ear-mountable listening device of claim 9 wherein the electronics package includes one or more microphones, wherein the acoustic package includes one or more electroacoustic transducers, wherein the first surface of the acoustic package is positioned to face the second surface of the electronics package when the ear-mountable listening device is worn such that the one or more microphones of the electronics package and the one or more electroacoustic transducers of the acoustic package are not influenced by the magnetic flux from the first set of magnets or by the magnetic flux from the second set of magnets.

11. The ear-mountable listening device of claim 1 wherein the sensor is at least one of a magnetometer, an accelerometer, and a gyroscope.

12. An ear-mountable listening device, comprising:

an acoustic package configured to emit audio in response to an audio signal, wherein the acoustic package includes a first set of magnets;

an electronics package electrically coupleable to the acoustic package to provide the audio signal to the acoustic package, wherein the electronics package includes a second set of magnets, wherein the first set of magnets and the second set of magnets are configured to magnetically couple the electronics package to the acoustic package via magnetic forces between the first set of magnets and the second set of magnets, wherein the first set of magnets and the second set of magnets allow for a rotary user interface for the ear-mountable listening device via rotation of the electronics package with respect to the acoustic package;

one or more sensors that may be utilized to determine a change in angular position of the electronics package relative to the acoustic package based on the rotation; and a controller electrically coupled to the one or more sensors and logic, wherein the logic, when executed by the controller, causes the ear-mountable listening device to perform operations including providing an output of the one or more sensors as an input to a machine learning model included in the logic, and wherein the machine learning model outputs the angular position of the electronics package with respect to the acoustic package.

13. A method, comprising:

monitoring output of one or more sensors of an ear-mountable listening device, wherein the ear-mountable listening device includes:

an acoustic package configured to emit audio in response to an audio signal, wherein the acoustic package includes a first set of magnets; and an electronics package electrically coupled to the acoustic package to provide the audio signal to the acoustic package, wherein the electronics package includes a second set of magnets, wherein the first set of magnets and the second set of magnets are configured to magnetically couple the electronics package to the acoustic package via magnetic forces between the first set of magnets and the second set of magnets, wherein the first set of magnets and the second set of magnets allow for a rotary user interface for the ear-mountable listening device via rotation of the electronics package about a central axis of the ear-mountable listening device with respect to the acoustic package;

calculating a change in angular position of the electronics package based at least in part on the output of the one or more sensors;

registering a rotary command input by a user of the ear-mountable listening device based at least in part on the change in the angular position; and implementing the rotary command input.

14. The method of claim 13 wherein implementing the rotary command input includes adjusting the audio emitted by the acoustic package.

15. The method of claim 13 wherein implementing the rotary command input includes at least one of pairing and unpairing a wireless connection, switching between multiple audio sources, executing play, pause, skip, or volume adjustment commands, and commencing a multi-way communication session.

16. The method of claim 13 wherein calculating the change in the angular position of the electronics package includes:

providing the output of the one or more sensors to a machine learning model; and outputting, by the machine learning model, the change in the angular position of the electronics package.

17. A binaural listening system, comprising:

a first ear-mountable listening device; and a second ear-mountable listening device, wherein each of the first ear-mountable listening device and the second ear-mountable listening device includes:

an acoustic package configured to emit audio in response to an audio signal, wherein the acoustic package includes a first set of magnets; and an electronics package electrically coupleable to the acoustic package to provide the audio signal to the acoustic package, wherein the electronics package includes a second set of magnets, wherein the first set of magnets and the second set of magnets are configured to magnetically couple the electronics package to the acoustic package via magnetic forces between the first set of magnets and the second set of magnets, wherein the first set of magnets and the second set of magnets allow for a rotary user interface for the first ear-mountable listening device or the second ear-mountable listening device via rotation of the electronics package with respect to the acoustic package, wherein at least one of the electronics package and the acoustic package further includes a sensor that may be utilized to determine an angular position of the electronics package relative to the acoustic package, and wherein at least one of the electronics package and the acoustic package further includes a controller electrically coupled to the sensor to calculate a change in the angular position due to the rotation based, at least in part, on an output of the sensor.

18. The binaural listening system of claim 17 wherein at least one of the first set of magnets and the second set of magnets is a monolithic structure.

19. The binaural listening system of claim 17 wherein the first set of magnets forms a first surface of the acoustic package, wherein the second set of magnets forms a second surface of the electronics package, and wherein the first surface is shaped to have conformal contact with the second surface when the first ear-mountable listening device and the second ear-mountable listening device are worn.

20. The binaural listening system of claim 17 wherein the sensor is at least one of a magnetometer, an accelerometer, and a gyroscope.

* * * * *